United States Patent
Chi et al.

(10) Patent No.: US 9,248,410 B2
(45) Date of Patent: Feb. 2, 2016

(54) FORWARD OSMOSIS MEMBRANE FOR SEAWATER DESALINATION AND METHOD FOR PREPARING THE SAME

(75) Inventors: Sung Dae Chi, Hwaseong-si (KR); Bong Jun Cha, Seoul (KR); Jong Hwa Lee, Anyang-si (KR); Doo Ri Kim, Seoul (KR); Su Jeong Lim, Suwon-si (KR)

(73) Assignee: Woongjin Chemical Co., Ltd. (KR)

( * ) Notice: Subject to any disclaimer, the term of this patent is extended or adjusted under 35 U.S.C. 154(b) by 1049 days.

(21) Appl. No.: 13/138,284

(22) PCT Filed: Feb. 9, 2011

(86) PCT No.: PCT/KR2011/000856
§ 371 (c)(1),
(2), (4) Date: Jul. 27, 2011

(87) PCT Pub. No.: WO2011/136465
PCT Pub. Date: Nov. 3, 2011

(65) Prior Publication Data
US 2012/0043274 A1    Feb. 23, 2012

(30) Foreign Application Priority Data

| Apr. 30, 2010 | (KR) | 10-2010-0040485 |
| Jul. 14, 2010 | (KR) | 10-2010-0067960 |
| Nov. 5, 2010 | (KR) | 10-2010-0109646 |
| Dec. 16, 2010 | (KR) | 10-2010-0129340 |

(51) Int. Cl.
*B01D 11/00* (2006.01)
*B01D 39/00* (2006.01)
(Continued)

(52) U.S. Cl.
CPC ............ *B01D 69/12* (2013.01); *B01D 67/0006* (2013.01); *B01D 69/10* (2013.01);
(Continued)

(58) Field of Classification Search
USPC .......... 210/500.38, 490, 500.41, 500.43, 644, 210/500.27
See application file for complete search history.

(56) References Cited

U.S. PATENT DOCUMENTS 6,063,278 A * 5/2000 Koo et al. ............... 210/500.38
6,805,796 B2 * 10/2004 Hirose et al. ............ 210/321.76
(Continued)

FOREIGN PATENT DOCUMENTS

| JP | 3020545 | 1/2000 |
| KR | 10-2002-0061690 | 7/2002 |

(Continued)

OTHER PUBLICATIONS

PCT/KR2011/000856 International Search Report dated Oct. 27, 2011.

(Continued)

*Primary Examiner* — Ana Fortuna
(74) *Attorney, Agent, or Firm* — D. Peter Hochberg; Sean F. Mellino

(57) ABSTRACT

A forward osmosis membrane for seawater desalination and a method for preparing the same. The forward osmosis membrane has a composite membrane structure including a nonwoven fabric layer, a hydrophilic polymer layer, and a polyamide layer. The hydrophilic polymer layer formed on the nonwoven fabric layer facilitates an inflow of water from the feed water to the draw solution to enhance flux and realize high water permeability in the direction of osmosis. The polyamide layer not only secures contamination resistance and chemical resistance but also minimizes the back diffusion of salts of the draw solution in the direction of reverse osmosis. Hence, the forward osmosis membrane of the present invention is greatly useful for desalination of high-concentration seawater.

18 Claims, 4 Drawing Sheets

(51) Int. Cl.
*B01D 39/14* (2006.01)
*C02F 1/44* (2006.01)
*B01D 69/12* (2006.01)
*B01D 67/00* (2006.01)
*B01D 69/10* (2006.01)
*B01D 71/56* (2006.01)
*B01D 61/00* (2006.01)
*B01D 71/16* (2006.01)
*B01D 71/38* (2006.01)
*B01D 71/40* (2006.01)
*B01D 71/42* (2006.01)
*B01D 71/44* (2006.01)
*B01D 71/52* (2006.01)
*B01D 71/60* (2006.01)

(52) U.S. Cl.
CPC ............ *B01D 69/125* (2013.01); *B01D 71/56* (2013.01); *B01D 61/00* (2013.01); *B01D 71/16* (2013.01); *B01D 71/38* (2013.01); *B01D 71/40* (2013.01); *B01D 71/42* (2013.01); *B01D 71/44* (2013.01); *B01D 71/52* (2013.01); *B01D 71/60* (2013.01); *B01D 2323/30* (2013.01); *B01D 2325/022* (2013.01); *B01D 2325/026* (2013.01); *B01D 2325/36* (2013.01)

(56) References Cited

U.S. PATENT DOCUMENTS

| | | | |
|---|---|---|---|
| 7,909,177 B2* | 3/2011 | Lee et al. | 210/490 |
| 8,201,485 B2* | 6/2012 | Lee et al. | 87/1 |
| 2006/0226067 A1 | 10/2006 | Herron | |
| 2009/0057225 A1* | 3/2009 | Krause et al. | 210/650 |
| 2010/0006495 A1* | 1/2010 | Buschmann | 210/500.25 |
| 2012/0273417 A1* | 11/2012 | McGinnis et al. | 210/637 |

FOREIGN PATENT DOCUMENTS

| | | |
|---|---|---|
| KR | 10-0477589 | 7/2005 |
| KR | 10-2008-0074019 | 8/2008 |
| KR | 10-2009-0037306 | 4/2009 |
| WO | WO2008/137082 | 11/2008 |

OTHER PUBLICATIONS

PCT/KR2011/000856 English translation of Written Opinion.

* cited by examiner

FORWARD OSMOSIS MEMBRANE FOR SEAWATER DESALINATION AND METHOD FOR PREPARING THE SAME

CROSS-REFERENCE TO RELATED APPLICATIONS

This application is a National Stage application of International Application No. PCT/KR2011/000856, filed on Feb. 9, 2011, which claims priority of Korean Application Serial Numbers 10-2010-0040485 filed on Apr. 30, 2010, 10-2010-0067960 filed on Jul. 14, 2010, 10-2010-0109646 filed on Nov. 5, 2010 and 10-2010-0129340 filed on Dec. 16, 2010, all of which are incorporated herein by reference in their entireties.

BACKGROUND OF THE INVENTION

1. Field of the Invention

The present invention relates to a forward osmosis membrane for seawater desalination and a method for preparing the same and, more particularly, to a forward osmosis membrane for seawater desalination and a method for preparing the same that facilitates an inflow of water from a feed water to a draw solution to realize high water permeability and excellent contamination resistance and particularly satisfies the property of preventing the back diffusion of solutes of the draw solution in the direction of reverse osmosis, thereby being suitable for desalinating high-concentration seawater.

2. Description of the Prior Art

Forward osmosis is a membrane separation technique that uses the osmotic pressure caused by the difference in concentration between two solutions as a driving force for transport of water from lower-concentration solution to higher-concentration solution through a membrane. As the forward osmosis is just the opposite of the reverse osmosis, the preparation of a forward osmosis membrane is also distinctive from that of a reverse osmosis membrane.

The forward osmosis membrane not only facilitates an inflow of water from feed water to a draw solution through the membrane but also plays an important role in maintaining a constant concentration of the draw solute and a high osmotic pressure. For this, it is of the essence that the forward osmosis membrane is designed to have high water permeability in the direction of osmosis and not to allow the solutes of the draw solution diffused in the direction of reverse osmosis. Likewise, the membrane with minimized contamination is given precedence in the preparation of a forward osmosis membrane. The necessary characteristics of a forward osmosis membrane are as follows.

Firstly, the support layer provided in the forward osmosis membrane is to have high porosity and low pore tortuosity in order to minimize the internal concentration polarization and to increase contamination resistance.

Secondly, the thickness of the forward osmosis membrane is be minimized in order to increase the flux of water passing through the membrane.

Thirdly, hydrophilic materials are used to minimize water-aided filtration resistance.

Fourthly, the solutes of the draw solution are not allowed to diffuse from higher-concentration solution to lower-concentration solution in order to maintain the draw solution at high concentration.

As for the conventional methods for preparing a forward osmosis membrane, U.S. Patent No. 2006-0226067 discloses a preparation method for a forward osmosis membrane using cellulose triacetate as a hydrophilic material. More specifically, solutions of a same material and different concentrations were applied on a support layer 25 to 75 μm thick to form a selective layer 8 to 18 μm thick. An evaluation in the forward osmosis (FO) mode using a draw solution, the membrane completed turned out to be a forward osmosis membrane having a high flux of 11 GFD. However, the membrane undesirably allowed the solutes of the draw solution to diffuse from higher-concentration draw solution to lower-concentration feed water. Such a membrane is impractical in the situation that requires the draw solution to be maintained higher in concentration than high-concentration feed water such as seawater that has a great content of salts.

According to the International Patent No. 2008-137082, a polysulfone solution was cast on a nonwoven fabric to form a membrane like an ultrafiltration membrane. On the surface of the membrane thus obtained, a polyamide reverse osmosis membrane was prepared by carrying out an interfacial polymerization reaction of polyfunctional amine and polyfunctional acyl halide. The membrane removed of the nonwoven fabric was applied to the forward osmosis (FO) system. A property assessment in the FO mode showed that the forward osmosis membrane had a flux of 0.5 GFD and a salt rejection rate more than 99%. The forward osmosis membrane secures a salt rejection rate good enough to separate high-concentration feed water such as seawater but has limitation in practical usage because of low flux.

The membrane prepared from a polysulfone-based polymer according to the prior art is excellent in mechanical strength and thermal and chemical stability and thus can be used as a membrane material. However, this kind of membrane tends to adsorb contaminants according to the characteristic of a hydrophobic membrane, which results in a loss of separation function and consequently reduced life span.

SUMMARY OF THE PRESENT INVENTION

It is an object of the present invention to provide a forward osmosis membrane suitable for desalination of high-concentration seawater.

It is another object of the present invention to provide a method for preparing a forward osmosis membrane for seawater desalination.

To accomplish the above objects, in accordance with a first preferred embodiment of the present invention, there is provided a forward osmosis membrane for seawater desalination that includes a hydrophilic polymer layer and a polyamide layer.

In accordance with a second preferred embodiment of the present invention, there is provided a forward osmosis membrane for seawater desalination that has a composite membrane structure of sequentially laminated layers including a nonwoven fabric layer, a hydrophilic polymer layer and a polyamide layer.

The forward osmosis membrane for seawater desalination has a conductivity per minute not more than 9.0 μS/cm per minute (over a membrane surface area of 24 cm$^2$) and shows a low back diffusion of salts. Simultaneously, the forward osmosis membrane has a flux of 3 to 20 GFD in the presence of a 2M NaCl draw solution or under an equivalent osmotic pressure condition.

In the forward osmosis membrane for seawater desalination of the present invention, the nonwoven fabric layer preferably has an air permeability at least 2 cc/cm$^2$·sec, an average pore size of 1 to 600 μm, and a contact angle of 0.1 to 74 degrees. Preferably, the nonwoven fabric layer has a thickness of 20 to 150 μm.

In accordance with the first and second embodiments of the present invention, the hydrophilic polymer layer includes any one selected from the group consisting of polyacrylonitrile, polyacrylate, polymethylmethacrylate, polyethylene imide, cellulose acetate, cellulose triacetate, polyvinyl alcohol, polyvinylpyrrolidone, polyethyleneglycol, polysulfone-based polymer, polyethylene oxide and polyvinyl acetate or mixture thereof.

The hydrophilic polymer as a mixture contains any one selected from polyvinylpyrrolidone, polyvinyl alcohol, polyethyleneglycol or cellulose acetate in an amount of 0.1 to 5 wt % in combination with polyacrylonitrile.

More preferably, the hydrophilic polymer as a mixture contains 0.1 to 10 wt % of a sulfonated polysulfone-based polymer represented by formula 1 in combination with the polysulfone-based polymer:

[Formula 1]

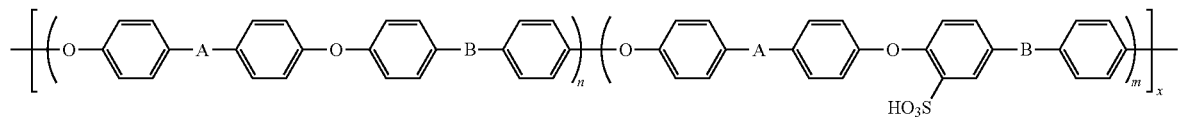

where A is any one functional group selected from:

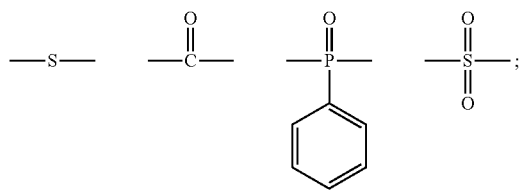

B is any one functional group selected from:

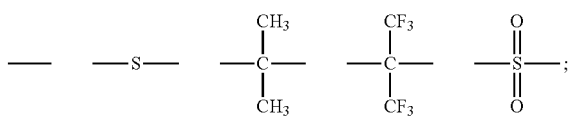

m/(n+m) is 0.2 to 0.7; and x is 50 to 2,300.

The polysulfone-based polymer is any one selected from the group consisting of polysulfone, polyethersulfone and polyarylethersulfone or mixture thereof. More preferably, the sulfonated polysulfone-based polymer is a compound represented by formula 2:

[Formula 2]

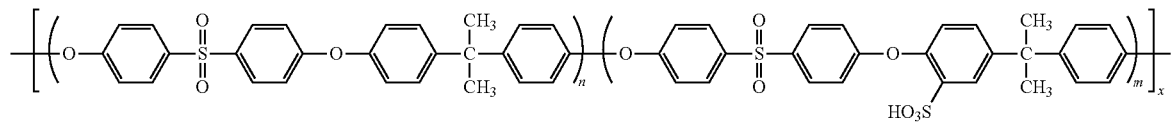

where m/(n+m) is 0.2 to 0.7; and x is 50 to 2,300.

In the forward osmosis membrane of the present invention, the hydrophilic polymer layer is characterized by finger-like pores. The thickness of the hydrophilic polymer layer is preferably in the range of 30 to 250 μm.

In the forward osmosis membrane of the present invention, the polyamide layer is formed by an interfacial polymerization of an aqueous solution containing polyfunctional amine or alkylated aliphatic amine and an organic solution containing a polyfunctional acyl halide compound.

More preferably, the polyamide layer is formed by an interfacial polymerization of an aqueous solution being prepared by further adding 0.01 to 2 wt % of the polyamine salt compound to an aqueous solution containing polyfunctional amine or alkylated aliphatic amine and an organic solution containing a polyfunctional acyl halide compound.

The polyamine salt compound is prepared from a tertiary polyamine and a strong acid at a molar ratio of 0.5~2:1. The tertiary polyamine is any one selected from the group consisting of 1,4-diazabicyclo[2,2,2]octane (DABCO), 1,8-diazabicyclo[5,4,0]undec-7-ene (DBU), 1,5-diazabicyclo[4,3,0]none-5-ene (DBN), 1,4-dimethylpiperazine, 4-[2-(dimethylamino)ethyl]morpholine, N,N,N',N'-tetramethylethylenediamine, N,N,N',N'-tetramethyl-1,3-butanediamine, N,N,N',N'-tetramethyl-1,4-butanediamine (TMBD), N,N,N',N'-tetramethyl-1,3-propanediamine, N,N,N',N'-tetramethyl-1,6-hexanediamine (TMHD), 1,1,3,3-tetramethylguanidine (TMGU) and N,N,N',N',N"-pentamethyldiethylenetriamine.

The present invention provides a method for preparing a forward osmosis membrane for seawater desalination having a three-layered structure of nonwoven fabric layer, hydrophilic polymer layer and polyamide layer that includes: (a) forming a hydrophilic polymer layer by doping a solution containing 10 to 25 wt % of a hydrophilic polymer on a nonwoven fabric layer; and (b) forming a polyamide layer by an interfacial polymerization reaction of an organic solution containing a polyfunctional acyl halide compound and an aqueous solution containing polyfunctional amine or alkylated aliphatic amine on the hydrophilic polymer layer.

The present invention also provides a method for preparing a forward osmosis membrane for seawater desalination having a two-layered structure of hydrophilic polymer layer and polyamide layer that includes: (a) forming a hydrophilic polymer layer by doping a solution containing 10 to 25 wt % of a hydrophilic polymer on a support; and (b) consecutively forming a polyamide layer on the hydrophilic polymer layer and then separating the support from the membrane.

In the method for preparing a forward osmosis membrane according to the present invention, the hydrophilic polymer constituting the hydrophilic polymer layer includes any one selected from the group consisting of polyacrylonitrile, polyacrylate, polymethylmethacrylate, polyethylene imide, cellulose acetate, cellulose triacetate, polyvinyl alcohol, polyvinylpyrrolidone, polyethyleneglycol, polysulfone-based polymer, polyethylene oxide and polyvinyl acetate or mixture thereof.

Preferably, the hydrophilic polymer as a mixture includes any one selected from polyvinylpyrrolidone, polyvinyl alcohol, polyethyleneglycol or cellulose acetate in an amount of 0.1 to 5 wt % in combination with polyacrylonitrile.

Preferably, the hydrophilic polymer as another mixture contains 0.1 to 10 wt % of a sulfonated polysulfone-based polymer represented by formula 1 in combination with the polysulfone-based polymer:

hydrophilic compound to an aqueous solution containing polyfunctional amine or alkylated aliphatic amine. The hydrophilic compound contains any one hydrophilic functional group selected from the group consisting of hydroxy group, sulfonate group, carbonyl group, trialkoxysilane group, anion group and tertiary amino group.

More preferably, the polyamide layer is formed by an interfacial polymerization of an aqueous solution further containing a polyamine salt compound and an organic solution containing a polyfunctional acyl halide compound. Here, the aqueous solution is prepared by adding 0.01 to 2 wt % of the polyamine salt compound as an aqueous additive to an aqueous solution containing polyfunctional amine or alkylated aliphatic amine.

[Formula 1]

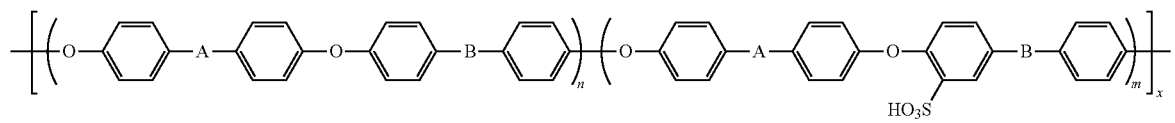

where A is any one functional group selected from:

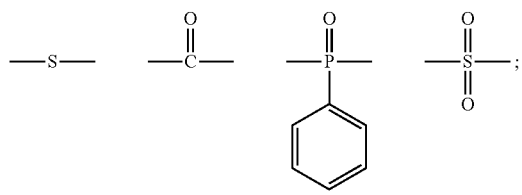

B is any one functional group selected from:

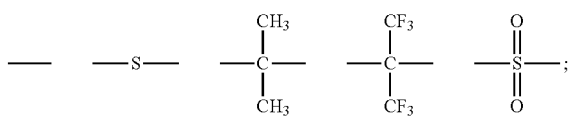

m/(n+m) is 0.2 to 0.7; and x is 50 to 2,300.

The polysulfone-based polymer is any one selected from the group consisting of polysulfone, polyethersulfone and polyarylethersulfone or mixture thereof. Preferably, the sulfonated polysulfone-based polymer is a compound represented by formula 2:

The polyamine salt compound is prepared from a tertiary polyamine and a strong acid at a molar ratio of 0.5~2:1. The tertiary polyamine is any one selected from the group consisting of 1,4-diazabicyclo[2,2,2]octane (DABCO), 1,8-diazabicyclo[5,4,0]undec-7-ene (DBU), 1,5-diazabicyclo[4,3,0]none-5-ene (DBN), 1,4-dimethylpiperazine, 4-[2-(dimethylamino)ethyl]morpholine, N,N,N',N'-tetramethylethylenediamine, N,N,N',N'-tetramethyl-1,3-butanediamine, N,N,N',N'-tetramethyl-1,4-butanediamine (TMBD), N,N,N',N'-tetramethyl-1,3-propanediamine, N,N,N',N'-tetramethyl-1,6-hexanediamine (TMHD), 1,1,3,3-tetramethylguanidine (TMGU) and N,N,N',N',N''-pentamethyldiethylenetriamine.

The aqueous solution further contains 0.01 to 2 wt % of a polar solvent, the polar solvent being any one selected from the group consisting of ethyleneglycol derivative, propyleneglycol derivative, 1,3-propanediol derivative, sulfoxide derivative, sulfone derivative, nitrile derivative, ketone derivative and urea derivative.

The forward osmosis membrane of the present invention is a composite membrane structure having a polyamide layer sequentially laminated on a hydrophilic support layer. More specifically, the forward osmosis membrane comprises a hydrophilic polymer layer and a polyamide layer, or has a structure of sequentially laminated layers of nonwoven fabric layer, hydrophilic polymer layer and polyamide layer.

[Formula 2]

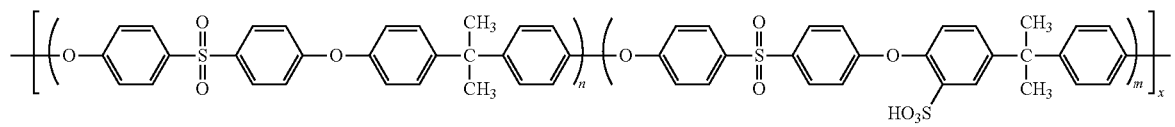

where m/(n+m) is 0.2 to 0.7; and x is 50 to 2,300.

In the method for preparing a forward osmosis membrane according to the present invention, the polyamide layer is formed by an interfacial polymerization of an aqueous solution further containing a hydrophilic compound and an organic solution containing a polyfunctional acyl halide compound. Here, the aqueous solution is prepared by adding the The hydrophilic polymer layer formed on the nonwoven fabric layer of high porosity and high hydrophilicity enhances the water permeability of the membrane and the water flux, while the polyamide layer secures contamination resistance and chemical resistance and prevents the back diffusion of salts of the draw solution in the direction of reverse osmosis. For that reason, the forward osmosis membrane of the present invention is suitable for high-concentration seawater desalination.

Moreover, the preparation method for forward osmosis membrane according to the present invention includes forming a hydrophilic polymer layer having high porosity and low pore tortoesity under optimum conditions not only to facilitate an inflow of water from the feed water to the draw solution but also to secure high water permeability in the direction of osmosis, and realizes a forward osmosis membrane with minimized contamination due to the polyamide layer.

DETAILED DESCRIPTION OF THE PREFERRED EMBODIMENT

Figure 1:
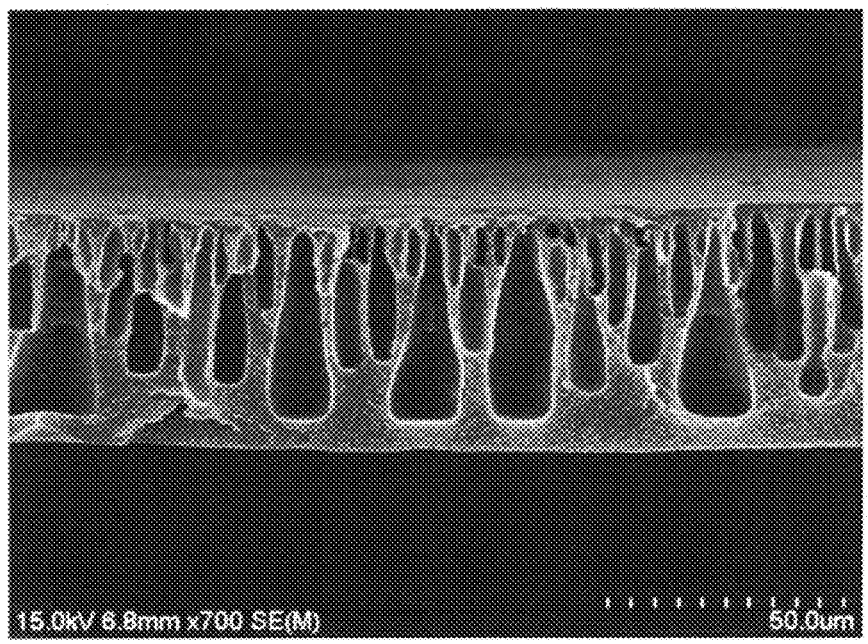
FIG. 1 is a micrograph showing the cross section of a hydrophilic polymer layer in the forward osmosis membrane according to Example 1 of the present invention.

Reference will be now made in detail to the preferred embodiment of the present invention with reference to the attached drawings.

In accordance with a first embodiment of the present invention, there is provided a forward osmosis membrane for seawater desalination comprising a hydrophilic polymer layer; and a polyamide layer.

In accordance with a second embodiment of the present invention, there is provided a forward osmosis membrane for seawater desalination having a composite membrane structure of sequentially laminated layers that comprises: a nonwoven fabric layer; a hydrophilic polymer layer; and a polyamide layer.

In the structure according to the first or second embodiment, the forward osmosis membrane of the present invention is characterized by a structure provided with a hydrophilic polymer layer having high porosity and high hydrophilicity designed to facilitate the inflow of water from a feed water into a draw solution and to have high water permeability in the direction of osmosis. As shown from the cross section of the hydrophilic polymer layer suggested in the embodiments of the present invention, the hydrophilic polymer layer has finger-like pores (shown in FIGS. 1, 4, 6 and 7) rather than bead-like pores as seen in the conventional reverse osmosis membrane (shown in FIG. 2). The forward osmosis membrane of the present invention preferably satisfies a flux of 3 to 30 GFD, more preferably 7 to 20 GFD with a 2M NaCl draw solution or under the equivalent osmotic pressure condition.

The structure of the forward osmosis membrane of the present invention is further characterized by the polyamide layer laminated on the hydrophilic polymer layer that endows the membrane with contamination resistance and chemical resistance and particularly prevents the solutes of the draw solution from diffusing in the direction of reverse osmosis to maintain high osmotic pressure, thereby realizing a suitable membrane for separation of high-concentration seawater.

Hence, the forward osmosis membrane of the present invention maintains excellent flux and shows a conductivity per minute not more than 9.0 µS/cm (over a membrane surface area of 24 cm$^2$) as measured in the forward osmosis mode using a 2M NaCl solution (osmotic pressure of about 100 atm) as a draw solution and ultrapure water as a feed water. When converted over the membrane area (24 cm$^2$), the back diffusion of salts is not more than 0.375 (µS/cm)/min·cm$^2$, which shows a low salt diffusion behavior. The back diffusion of salts means that the solutes of the higher concentration draw solution are transported into the lower concentration feed water. Hence, the forward osmosis membrane of the present invention is suitable for separation of high-concentration seawater. Contrarily, if the conductivity is more than 9.0 µS/cm per minute over a membrane surface area of 24 cm$^2$ as measured in the forward osmosis mode, a large quantity of salts contained in the draw solution flows into the feed water, increases the back diffusion of salts and thus deteriorates the performance of the membrane. Furthermore, a loss of salts in the draw solution results in a decreased osmotic pressure, causing not only a sudden drop of the permeation flux but also a need for continuously supplying salts in the draw solution in order to maintain the osmotic pressure at a constant level. Accordingly, the seawater desalination effect can be achieved when the membrane has a conductivity not more than 9.0 µS/cm per minute over a membrane surface area of 24 cm$^2$, or when converted over the membrane area (24 cm$^2$), a back diffusion of salts is not more than 0.375 (µS/cm)/min·cm$^2$.

The polyamide layer can even remove monovalent ions that are hard to remove with a single-structure membrane, so the forward osmosis membrane having the polyamide layer of the present invention secures more than 90% salt rejection rate.

Hereinafter, the forward osmosis membrane of the present invention will be described in detail component by component.

1) Nonwoven Fabric Layer

In the forward osmosis membrane of the present invention, the nonwoven fabric layer acts as a support of the membrane.

The preferred material used for the nonwoven fabric layer of the present invention is synthetic fabric selected from the group consisting of polyester, polypropylene, nylon and polyethylene; or natural fabric including cellulose. According to the porosity and hydrophilicity of its material, the nonwoven fabric layer determines the properties of the membrane.

Preferably, the nonwoven fabric layer may include, but is not specifically limited to, any material having a porosity to meet an air permeability at least 2 cc/cm$^2$·sec, more preferably 2 to 20 cc/cm$^2$·sec. The average pore diameter of the nonwoven fabric layer of the present invention is preferably 1 to 600 µm, more preferably 5 to 300 µm, in which the membrane facilitates an inflow of water and shows higher water permeability as necessary for the forward osmosis membrane.

Figure 3:
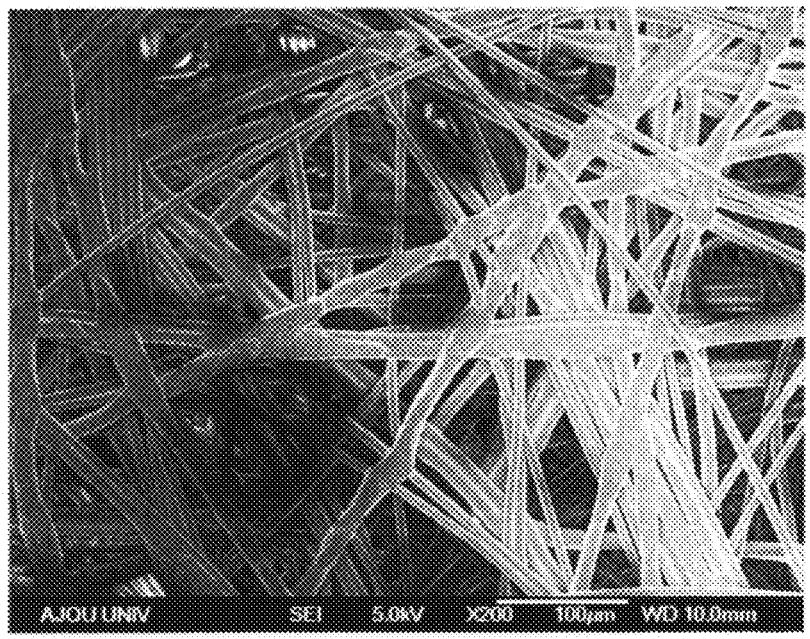
FIG. 3 is a micrograph showing the front view of a nonwoven fabric layer of the forward osmosis membrane according to Example 5 of the present invention.
Figure 5:
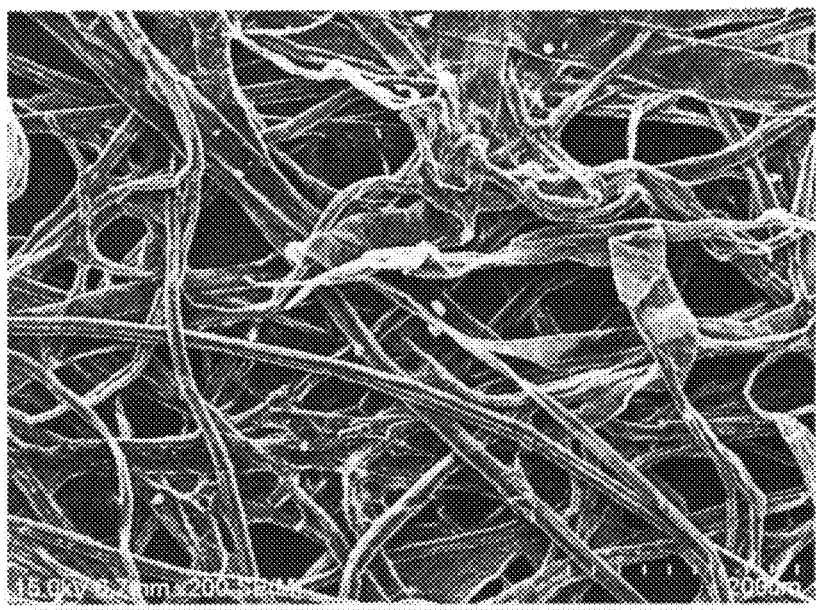
FIG. 5 is a micrograph showing the front view of a nonwoven fabric layer of the forward osmosis membrane according to Example 11 of the present invention.

FIG. 3 is a micrograph showing the surface of a nonwoven fabric web having an air permeability of 2 to 10 cc/cm²·sec as used in an embodiment of the present invention. FIG. 5 is a micrograph showing the surface of a nonwoven fabric web having an air permeability of at least 10 cc/cm²·sec in an embodiment of the present invention. The higher porosity of the nonwoven fabric layer more facilitates an inflow of water from the feed water into the draw solution and secures higher water permeability in the direction of osmosis.

Figure 2:
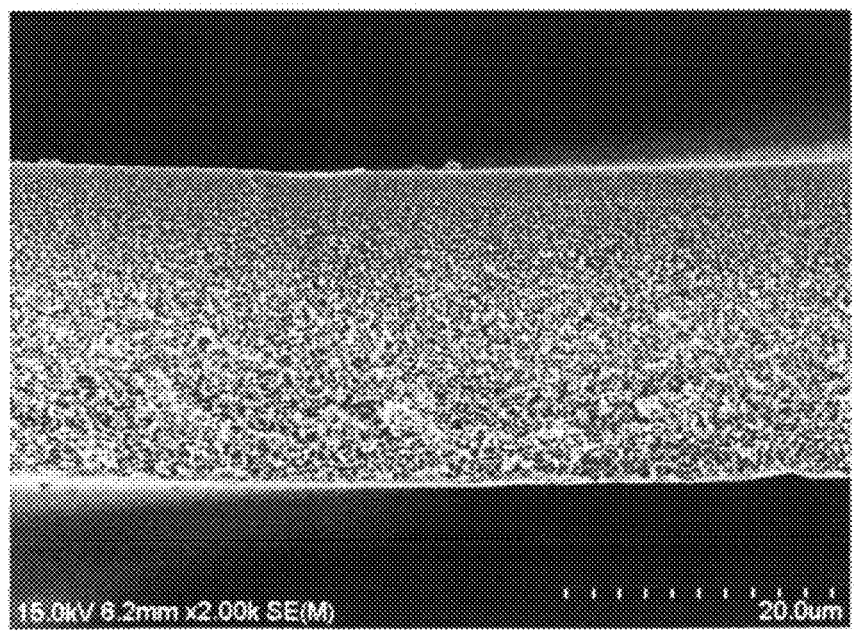
FIG. 2 is a micrograph showing the cross section of a polysulfone porous support according to Comparative Example 1 of the present invention.

Contrarily, FIG. 2 is a micrograph showing the cross section of a polysulfone porous support used in a conventional reverse osmosis membrane, which has a denser structure in comparison with the porosity as seen in FIGS. 3 and 5.

The nonwoven fabric used in the embodiment of the present invention has such a high hydrophilicity as to absorb water within 5 seconds at less than 5 degrees of contact angle immediately after getting in contact with water, while the nonwoven fabric used for a reverse osmosis membrane shows a contact angle of 75 to 90 degrees. The material useful for the nonwoven fabric layer of the present invention preferably has hydrophilicity less than 0.1 to 75 degrees and, more preferably, a contact angle of 0.1 to 60 degrees. Hence, the nonwoven fabric layer of the present invention meets high hydrophilicity, it is required to reduce water resistance and to prevent contamination of the membrane caused by internal concentration polarization (ICP). The internal concentration polarization (ICP) deteriorates the permeability of the membrane due to contamination in the membrane and significantly reduces the flux particularly in a forward osmosis membrane that is driven by the osmotic pressure resulting from a concentration difference naturally occurring.

The thickness of the nonwoven fabric layer of the present invention is preferably in the range of 20 to 150 µm. The nonwoven fabric layer less than 20 µm thick is too weak to support the whole membrane, while the nonwoven fabric layer more than 150 µm thick causes a deterioration of the flux.

2) Hydrophilic Polymer Layer

In the forward osmosis membrane of the present invention, a hydrophilic material is used for the hydrophilic polymer layer in order to minimize water-aided permeation resistance.

Preferably, the hydrophilic polymer layer includes any one selected from the group consisting of polyacrylonitrile, polyacrylate, polymethylmethacrylate, polyethylene imide, cellulose acetate, cellulose triacetate, polyvinyl alcohol, polyvinylpyrrolidone, polyethyleneglycol, polysulfone-based polymer, polyethylene oxide and polyvinyl acetate or mixture thereof.

More preferably, the hydrophilic polymer as a mixture form contains any one selected from polyvinylpyrrolidone, polyvinyl alcohol, polyethyleneglycol or cellulose acetate in an amount of 0.1 to 5 wt % in combination with polyacrylonitrile. The mixing ratio less than 0.1 wt % hardly realizes a property improving effect of the polymer added, while the mixing ratio greater than 5 wt % leads to an excessively high viscosity of the hydrophilic polymer solution, making it difficult to prepare the support layer.

The hydrophilic polymer as another mixture form contains a synthetic polymer prepared by copolymerization of polyacrylonitrile (PAN) and a polymer having a hydrophilic functional group. The polymer having hydrophilic a functional group is a polymer compatible with polyacrylonitrile (PAN). The hydrophilic functional group of the polymer is selected from hydroxyl group, sulfonate group, carbonyl group, acetate group, or ester group. The preferred examples of the synthetic polymer are PAN-vinyl acetate copolymer, or PAN-acrylic ester copolymer.

When the hydrophilic polymer is treated with base (OH), the membrane has enhanced hydrophilicity. Hence, the hydrophilic polymer used in the present invention includes a compound treated to hydrophilicity.

The hydrophilic polymer layer of the present invention is formed by a hydrophilic polymer mixture comprising 0.1 to 10 wt % of a sulfonated polysulfone-based polymer represented by the following formula 1 in combination with the polysulfone-based polymer:

[Formula 1]

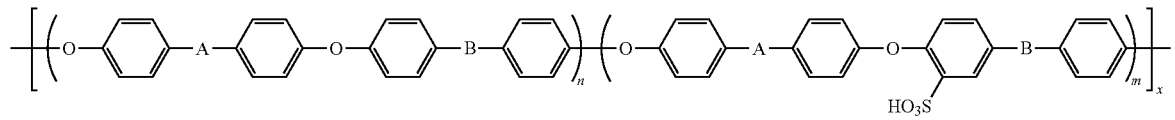

where A is any one functional group selected from:

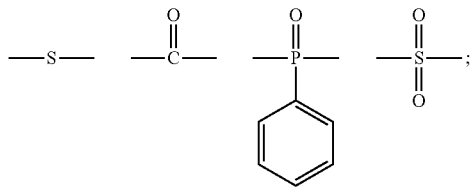

B is any one functional group selected from:

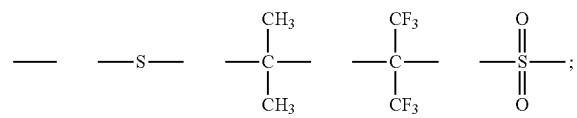

m/(n+m) is 0.2 to 0.7; and x is 50 to 2,300.

In the embodiment of the present invention, a preferred example of the sulfonated polysulfone-based polymer may include, but is not limited to, a compound represented by the following formula 2:

[Formula 2]

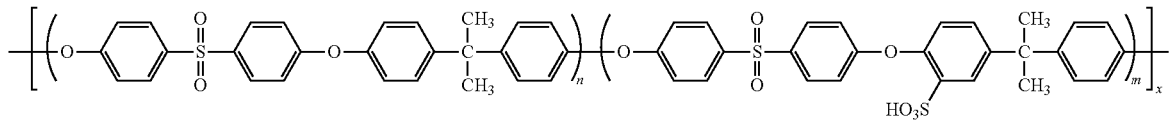

where m/(n+m) is 0.2 to 0.7; and x is 50 to 2,300.

The preferred example of the polysulfone-based polymer includes any one selected from the group consisting of polysulfone, polyethersulfone and polyarylethersulfone, or mixture thereof.

Preferably, the mixture form contains 0.1 to 10 wt % of a sulfonated polysulfone-based polymer represented by the formula 1 in combination with polysulfone. The mixture ratio less than 0.1 wt % hardly realizes the hydrophilic effect of the polymer added, while the mixture ratio exceeding 10 wt % leads to an excessively high viscosity of the solution, consequently with difficulty in preparing the solution. Thus, the membrane is difficult to making the polyamide layer due to an extreme increase of the hydrophilicity of the polymer layer.

Figure 7:
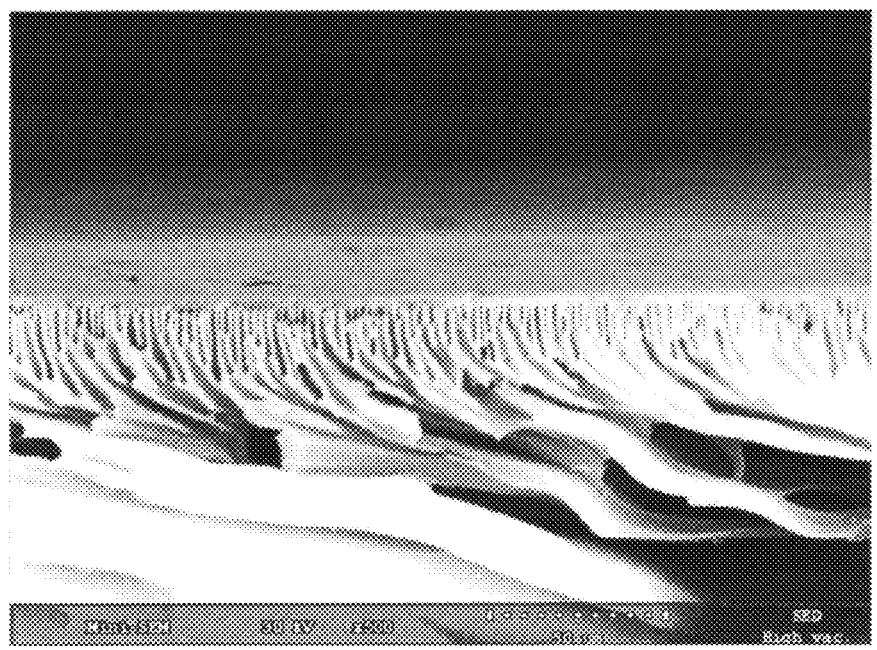
FIG. 7 is a micrograph showing the cross section of a hydrophilic polymer layer containing a sulfonated polysulfone-based polymer according to Example 12 of the present invention.

In accordance with the hydrophilic polymer layer formed by using a sulfonated polysulfone-based polymer as a hydrophilic material in combination with the polysulfone-based polymer, the hydrophilic polymer layer is minimizing the permeation resistance of water. FIG. 7 is a micrograph showing a cross section of the hydrophilic polymer layer containing the sulfonated polysulfone-based polymer, in which the hydrophilic polymer layer shows high porosity and low pore tortuosity due to a uniform finger-like pore structure. The porosity dependent on the hydrophilicity can be controlled by the choice of the hydrophilic polymer.

The thickness of the hydrophilic polymer layer is desirably minimized in order to increase the flux, preferably in the range of 30 to 250 μm.

2) Polyamide Layer

In the forward osmosis membrane of the present invention, the polyamide layer is formed by an interfacial polymerization of an aqueous solution containing polyfunctional amine or alkylated aliphatic amine and an organic solution containing a polyfunctional acyl halide compound on the hydrophilic polymer.

More specifically, on the surface of the hydrophilic polymer layer formed on the nonwoven fabric layer, the polyamide layer is formed by an interfacial polymerization of an aqueous solution containing polyfunctional amine or alkylated aliphatic amine selected from m-phenyldiamine, p-phenyldiamine, o-phenyldiamine, piperazine, or alkylated piperazine in contact with an organic solution containing a polyfunctional acyl halide compound selected from polyfunctional sulfonyl halide or polyfunctional isocyanate.

Otherwise, a hydrophilic compound is further added to the aqueous solution containing polyfunctional amine or alkylated aliphatic amine. The resulting aqueous solution is then put in contact with an organic solution containing a poly multi-functional acyl halide compound on the surface of the hydrophilic polymer layer, causing an interfacial polymerization reaction between the compounds to form a polyamide layer with enhanced contamination resistance. Preferably, the hydrophilic compound is contained in the aqueous solution in an amount of 0.001 to 8 wt %, more preferably 0.01 to 4 wt %.

Preferably, the hydrophilic compound added to the aqueous solution containing polyfunctional amine or alkylated aliphatic amine is a hydrophilic compound having at least one hydrophilic functional group selected from the group consisting of hydroxyl group, sulfonate group, carbonyl group, trialkoxysilane group, anion group, or tertiary amino group. More preferably, the hydrophilic compound is a hydrophilic amino compound.

More preferably, the preferred example of the hydrophilic compound having a hydroxyl group is selected from the group consisting of 1,3-diamino-2-propanol, ethanolamine, diethanolamine, 3-amino-1-propanol, 4-amino-1-butanol and 2-amino-1-butanol.

The hydrophilic compound having a carbonyl group is selected from the group consisting of amino-acetaldehyde dimethyl acetal, α-aminobutyrolactone, 3-aminobenzamide, 4-aminobenzamide, and N-(3-aminopropyl)-2-pyrrolidinone.

The hydrophilic compound having a trialkoxysilane group is selected from the group consisting of (3-aminopropyl)triethoxysilane and (3-aminopropyl)trimethoxysilane.

The hydrophilic compound having an anion group is selected from the group consisting of glycine, taurine, 3-amino-1-propenesulfonic acid, 4-amino-1-butenesulfonic acid, 2-aminoethylhydrogene sulfate, 3-aminobenzenesulfonic acid, 3-amino-4-hydroxybenzenesulfonic acid, 4-aminobenzenesulfonic acid, 3-aminopropylphosphonic acid, 3-amino-4-hydroxybenzoic acid, 4-amino-3-hydroxybenzoic acid, 6-aminohexeneoic acid, 3-aminobutaneoic acid, 4-amino-2-hydroxybutyric acid, 4-aminobutyric acid and glutamic acid.

The hydrophilic compound having at least one tertiary amino group is selected from the group consisting of 3-(diethylamino)propylamine, 4-(2-aminoethyl)morpholine, 1-(2-aminoethyl)piperazine, 3,3'-diamino-N-methyldipropylamine and 1-(3-aminopropyl)imidazole.

More preferably, the polyamide layer of the present invention is formed by an interfacial polymerization of an aqueous solution further containing a polyamine salt compound in contact with an organic solution containing a polyfunctional acyl halide compound. The polyamide layer is formed on polymer layer, which laminated on the support consisting of the nonwoven fabric layer. Here, the aqueous solution is prepared by further adding 0.01 to 2 wt % of the polyamine salt compound as an aqueous additive to an aqueous solution containing polyfunctional amine or alkylated aliphatic amine.

An addition of the polyamine salt compound to the polyfunctional amine-containing aqueous solution is beneficial in formation of pores of the polyamide layer, so the pores acting as acid acceptors enhance flux and accelerate the interfacial reaction. The polyamine salt compound is preferably used in an amount of 0.01 to 2 wt %. The content of the polyamine salt compound less than 0.01 wt % hardly realizes formation of pores for enhancing the flux, while the content of the polyamine salt compound exceeding 2 wt % affects the formation of a polyamide chain to cause defectives in the coating layer.

More preferably, the polyamine salt is a tertiary polyamine salt compound prepared from a tertiary polyamine and a strong acid at a molar ratio of 0.5~2:1. The molar ratio of the tertiary polyamine salt less than 0.5 hardly realizes the effect of the tertiary polyamine salt for enhancing the flux, while the molar ratio of the tertiary polyamine salt exceeding 2 allows polyamine remaining after the reaction to affect the formation of the polyamide chain.

The examples of the strong acid include any one selected from the group consisting of aromatic sulfonic acid, aliphatic sulfonic acid, cycloaliphatic sulfonic acid, trifluoroacetic acid, nitric acid, hydrochloric acid and sulfonic acid or mixture thereof.

The polyamine used in the present invention is a compound that at least two monovalent or divalent amines bond together. The polyamine is preferably an aliphatic or aromatic polyamine, more preferably a tertiary polyamine. The tertiary polyamine includes any one selected from the group consisting of 1,4-diazabicyclo[2,2,2]octane (DABCO), 1,8-diazabicyclo[5,4,0]undec-7-ene (DBU), 1,5-diazabicyclo[4,3,0]none-5-ene (DBN), 1,4-dimethylpiperazine, 4-[2-(dimethylamino)ethyl]morpholine, N,N,N',N'-tetramethylethylenediamine, N,N,N',N'-tetramethyl-1,3-butanediamine, N,N,N',N'-tetramethyl-1,4-butanediamine (TMBD), N,N,N',N'-tetramethyl-1,3-propanediamine, N,N,N',N'-tetramethyl-1,6-hexanediamine (TMHD), 1,1,3,3-tetramethylguanidine (TMGU) and N,N,N',N',N''-pentamethyldiethylenetriamine.

For the purpose of improving the flux of the membrane, the aqueous solution of polyfunctional amine may further contain 0.01 to 2 wt % of at least one or two polar solvents as well as the polyamine salt compound. The polar solvent is selected from the group consisting of ethyleneglycol derivative, propyleneglycol derivative, 1,3-propanediol derivative, sulfoxide derivative, sulfone derivative, nitrile derivative, ketone derivative and urea derivative, or mixture thereof.

As describe above, the forward osmosis membrane of the present invention not only has the polyamide layer secure high salt rejection, chemical resistance and pH stability but also further contains the polyamine salt compound added as an aqueous additive in forming the polyamide layer to enhance the flux of the membrane and to prevent the solutes of the draw solution from diffusing in the direction of reverse osmosis.

The forward osmosis membrane of the present invention can even remove monovalent ions that are hard to remove with a single membrane structure, thereby securing high salt rejection.

The present invention provides a method for preparing the forward osmosis membrane for seawater desalination according to the present invention.

More specifically, there is provided a method for preparing a forward osmosis membrane for seawater desalination having a three-layered structure of nonwoven fabric layer, hydrophilic polymer layer and polyamide layer that includes: (a) forming a hydrophilic polymer layer by doping a solution containing 10 to 25 wt % of a hydrophilic polymer on a nonwoven fabric layer; and (b) forming a polyamide layer by an interfacial polymerization reaction of an organic solution containing a polyfunctional acyl halide compound in contact with an aqueous solution containing polyfunctional amine or alkylated aliphatic amine on the hydrophilic polymer layer.

There is also provided a method for preparing a forward osmosis membrane for seawater desalination having a two two-layered structure of hydrophilic polymer layer and polyamide layer that includes: (a) forming a hydrophilic polymer layer by doping a solution containing 10 to 25 wt % of a hydrophilic polymer on a support having a smooth surface, such as glass plate or nonwoven fabric; and (b) consecutively forming a polyamide layer on the hydrophilic polymer layer and then separating the support from the membrane.

The step (a) is designed for the forward osmosis membrane to facilitate an inflow of water from the feed water into the draw solution and to secure high water permeability in the direction of osmosis.

To achieve the designing purpose of the step (a), the hydrophilic polymer layer is formed using a solution containing a hydrophilic polymer.

The hydrophilic polymer layer uses a hydrophilic material to facilitate water flow and secure high water permeability in the direction of osmosis. The preferred examples of the hydrophilic polymer include any one selected from the group consisting of polyacrylonitrile, polyacrylate, polymethylmethacrylate, polyethylene imide, cellulose acetate, cellulose triacetate, polyvinyl alcohol, polyvinylpyrrolidone, polyethyleneglycol, polysulfone-based polymer, polyethylene oxide and polyvinyl acetate or mixture thereof.

The example of the hydrophilic polymer also includes a mixture form in combination with the hydrophilic polymer, or a synthetic copolymer of the hydrophilic polymer and a hydrophilic compound having a hydrophilic functional group.

Another example of the hydrophilic polymer includes a compound endowed with hydrophilicity through a base-treatment for increasing hydrophilicity.

The specific example of the hydrophilic polymer is the same as previously stated in regard to the forward osmosis membrane and will not be described in further detail.

In the step (a), the content of the hydrophilic polymer in the hydrophilic polymer containing solution is preferably in the range of 10 to 25 wt %, more preferably 13 to 20 wt %. The hydrophilic polymer content less than 10 wt % tends to produce large-sized pores, with failure to form a porous structure capable of removing salts and consequently a deterioration of membrane separation performance. The hydrophilic polymer content of more than 25 wt % increases viscosity, making membrane formation difficult, or produces less or too minute pores, deteriorating the membrane separation performance.

The hydrophilic polymer layer of the present invention tends to have higher porosity with an increase in the hydrophilicity that is dependent on the type and content of the hydrophilic polymer, and the pores thus obtained have a uniform finger-like structure and consequently low pore tortuosity (see FIGS. 1, 4, 6 and 7).

The thickness of the hydrophilic polymer layer is preferably minimized to 30 to 250 μm in order to increase the flux.

In the step (a), the nonwoven fabric layer is provided not only to act as a support for the membrane but also to facilitate water flow pertaining to coarse porosity and high hydrophilicity.

Preferably, the material useful for the nonwoven fabric layer may include, but is not limited to, any material having porosity that allows an air permeability at least 2 cc/cm$^2$·sec. More preferably, the material for the nonwoven fabric layer secures an air permeability in the range of 2 to 20 cc/cm$^2$·sec. The nonwoven fabric can be a nonwoven fabric prepared by, if not specifically limited to, the conventional preparation method, more preferably a wet nonwoven fabric prepared by the paper making process. The nonwoven fabric layer may be included in or detached from the final forward osmosis membrane structure.

In the preparation method of the present invention, the step (b) is to form a polyamide layer on the hydrophilic polymer layer prepared in the step (a).

The polyamide layer is prepared by an interfacial polymerization of an organic solution containing a polyfunctional acyl halide compound selected from polyfunctional acyl halide, polyfunctional sulfonyl halide, or polyfunctional isocyanate and an aqueous solution containing polyfunctional amine or alkylated aliphatic amine selected from m-phenyldiamine, p-phenyldiamine, o-phenyldiamine, or alkylated piperidine.

In the preparation method of the present invention, the polyamide layer is also prepared by an interfacial polymerization of an aqueous solution further containing a hydrophilic compound and an organic solution containing polyfunctional acyl halide compound, the aqueous solution being prepared by adding the hydrophilic compound to an aqueous solution containing polyfunctional amine or alkylated aliphatic amine, the hydrophilic compound having any one hydrophilic functional group selected from the group consisting of hydroxy group, sulfonate group, carbonyl group, trialkoxysilane group, anion group and tertiary amino group.

More preferably, the polyamide layer is prepared by an interfacial polymerization of an aqueous solution further containing a polyamine salt compound and an organic solution containing a polyfunctional acyl halide compound, the aqueous solution further containing a polyamine salt compound being prepared by adding 0.01 to 2 wt % of the polyamine salt compound as an aqueous additive to an aqueous solution containing polyfunctional amine or alkylated aliphatic amine.

The polyamine salt compound is prepared from a tertiary polyamine and a strong acid at a molar ratio of 0.5~2:1. The tertiary polyamine is any one selected from the group consisting of 1,4-diazabicyclo[2,2,2]octane (DABCO), 1,8-diazabicyclo[5,4,0]undec-7-ene (DBU), 1,5-diazabicyclo[4,3,0]none-5-ene (DBN), 1,4-dimethylpiperazine, 4-[2-(dimethylamino)ethyl]morpholine, N,N,N',N'-tetramethylethylenediamine, N,N,N',N'-tetramethyl-1,3-butanediamine, N,N,N',N'-tetramethyl-1,4-butanediamine (TMBD), N,N,N',N'-tetramethyl-1,3-propanediamine, N,N,N',N'-tetramethyl-1,6-hexanediamine (TMHD), 1,1,3,3-tetramethylguanidine (TMGU) and N,N,N',N',N''-pentamethyldiethylenetriamine.

For the purpose of increasing the flux of the membrane, at least one or two polar solvents as well as the polyamine salt compound is further added to the polyfunctional amine aqueous solution in an amount of 0.01 to 2 wt %. The polar solvent as used herein is selected from the group consisting of ethyleneglycol derivative, propyleneglycol derivative, 1,3-propanediol derivative, sulfoxide derivative, sulfone derivative, nitrile derivative, ketone derivative and urea derivative.

In the preparation method of the present invention, a composite membrane of laminated layers is completed in step (b) that has the polyamide layer laminated on the hydrophilic polymer layer acting as a porous support. The polyamide layer secures contamination resistance and chemical resistance. Contrary to a single layer structure that hardly removes minute salts such as monovalent ions because of large pore size, the composite membrane structure of the present invention having the polyamide layer can remove even monovalent ions, that is, achieving high salt rejection and preventing the back diffusion of the solutes of the draw solution in the direction of reverse osmosis.

In the preparation method for the forward osmosis membrane of the present invention, in order to provide a stable layer structure, the complete membrane is formed to include a hydrophilic polymer layer in combination with a nonwoven fabric layer formed as a support, and a polyamide layer consecutively formed on an interfacial surface of the hydrophilic polymer layer.

In an alternative manner, the nonwoven fabric layer can be detached from the whole membrane structure. The process of separating the support from the membrane is well known to those skilled in the art and will not be further described in this specification.

The support as used herein is any material having a smooth surface and preferably includes, but is not limited to, glass plate, nonwoven fabric, or the like.

Hereinafter, the present invention will be described in detail in connection with preferred examples.

It is obvious that the examples are not intended to limit scope of the invention to those examples.

1. Preparation of Forward Osmosis Membrane for Seawater Desalination Having Two-Layered Structure Example 1

A solution containing 17.5 wt % of polyacrylonitrile as a hydrophilic polymer in an organic solvent was cast 50 μm thick on a glass plate and then subjected to phase transition in water used as a nonsolvent at the room temperature to form a hydrophilic polymer layer. The hydrophilic polymer layer thus obtained was kept in ultrapure water for about one day to extract the solvent. On the surface of the solvent-extracted membrane, an aqueous solution containing 2 wt % of m-phenylenediamine (MPD) was put in interfacial contact with an organic solution containing 0.1 wt % of trimesoyl chloride (TMC) in an ISOPAR solvent (Exxon Corp.) to form a polyamide layer by a polymerization reaction between the compounds, completing a composite membrane.

Examples 2, 3 and 4

The procedures were performed to prepare a composite membrane in the same manner as described in Example 1, excepting that the membrane composition was given as presented in Table 1.

Comparative Example 1

The procedures were performed to prepare a composite membrane in the same manner as described in Example 1, excepting that a polyamide layer is formed on a porous polysulfone support.

Comparative Example 2

A membrane was prepared that consists of a single cellulose triacetate material.

Experimental Example 1

Flux Measurement

On both sides of the membrane prepared above, water was induced to flow from the feed water to the draw solution. The before and after weight of the draw solution over time was measured to determine the quantity of water per time. Here, the draw solution was 2M NaCl solution, and the feed water was ultrapure water (the osmotic pressure about 100 atm).

Experimental Example 2

Measurement of Back Diffusion of Salts

The membranes prepared above were measured in regard to a change of the electrical conductivity of salts flowing from the draw solution to the feed water with a conductivity meter, where the feed water was ultrapure water (the osmotic pressure about 100 atm) and the draw solution was salt water (2M NaCl). The back diffusion degree of salts was used to evaluate the unit of conductivity variation (μS/cm) per minute over a defined membrane area (24 cm$^2$) [the conductivity of solids dissolved in water: μS/cm×0.5~0.6=TDS (Total Dissolved Solids, mg/L)].

The conductivity per minute [(μS/cm)/min] over the membrane area (24 cm$^2$) was converted a presented in Table 1. The back diffusion degree of salts was evaluated from the results.

Experimental Example 3

Measurement of Salt Rejection

The salt rejection of the membrane prepared above was determined by measuring the amount of salt in the used feed water and the amount of salt contained in the water passing through the membrane to evaluate the salt ratio of the passed water to the feed water in percentage. Here, the amount of salts in the feed water and the passed water was measured by IC, and the salt rejection of the membrane was determined as a salt ratio of the passed water to the feed water.

As presented in Table 1, the property measurement results of the membrane were evaluated in the forward osmosis mode under the solution condition of 2M NaCl solution/ultrapure water.

The membrane of Comparative Example 2 that has a single membrane structure of a single cellulose triacetate material as a hydrophilic material showed considerably high flux but had a great variation of the back diffusion of salts, which makes the membrane impractical when used as a forward osmosis membrane.

Whereas, the membranes prepared in the Examples of the present invention were controllable in porosity and hydrophilicity depending on the type and content of a polymer constituting the hydrophilic polymer material. More specifically, the membranes of the present invention had excellent flux, that is, at least 16.0 GFD, and low conductivity less than 9.0 (μS/cm)-per minute (over a membrane area of 24 cm$^2$), showing a satisfactory behavior regarding the back diffusion of salts and overcoming the problem of allowing the solutes of the draw solution to diffuse in the direction of reverse osmosis.

FIG. 1 is a 700× micrograph showing the cross section of a hydrophilic polymer layer in the forward osmosis membrane according to Example 1. The hydrophilic polymer layer had high porosity and low tortuosity due to a uniform finger-like pore structure. FIG. 2 is a micrograph showing the cross section of a polysulfone porous support used for a conventional reverse osmosis membrane, which shows a dense structure with respect to the porosity of the membrane prepared in Example 1.

TABLE 1

Properly Assessment of Membrane Using 2M NaCl Draw Solution

| Div. | Membrane Composition (Polymer Layer/Polyamide Layer) | Flux (GFD) | Change of the Conductivity per min ((μS/cm)/min) | Back Diffusion of Salts per Area ((μS/cm)/min · cm$^2$) | Salt Rejection (%) |
|---|---|---|---|---|---|
| Example 1 | 17.5 wt % PAN/PA | 18.2 | 3.8 | 0.158 | 97.8 |
| Example 2 | 15 wt % P-CO-PAN/PA | 20.6 | 4.2 | 0.175 | 97.9 |
| Example 3 | 17 wt % PSf + 1 wt % S-PSf/PA | 16.0 | 6.3 | 0.263 | 95.9 |
| Example 4 | 19 wt % PSf + 1 wt % S-PSf/PA | 16.4 | 0.6 | 0.0250 | 99.6 |
| Comparative Example 1 | 18 wt % PSf/—/PA | 1.2 | 0.065 | 0.00271 | 99.4 |
| Comparative Example 2 | CTA | 10 | 9.12 | 0.380 | 90.4 |

Effective Membrane Area: 24 cm$^2$
PAN: Polyacrylonitrile
P-CO-PAN: Polyacrylonitrile-vinylacetate copolymer
PA: Polyamide
PSf: Polysulfone
S-PSf: Sulfonated Polysulfone
CTA: Cellulose Triacetate As shown in Table 1, when the membrane of Comparative Example 1 having a polyamide layer on a polysulfone porous support prepared as a conventional reverse osmosis membrane was put in the forward osmosis mode, the back diffusion of salts appeared considerably insignificant with a great drop of flux. In the membrane structure of Comparative Example 1, the formation of the polyamide layer is minimized the back diffusion of salts.

2. Preparation of Forward Osmosis Membrane for Seawater Desalination Having Three-Layered Structure Example 5

A solution containing 17 wt % of polyacrylonitrile as a hydrophilic polymer in an organic solvent was cast 50 μm thick on a nonwoven fabric 1 having an air permeability of 6.3 cc/cm²·sec as prepared by the paper making process, and then subjected to phase transition in water used as a nonsolvent at the room temperature to form a hydrophilic polymer layer. The nonwoven fabric 1 had a contact angle changed from 80 degrees to one degree over 4 seconds, with an average pore diameter of 7.5 μm. The hydrophilic polymer layer formed on the nonwoven fabric layer was kept in ultrapure water for about one day to extract the solvent. On the surface of the solvent-extracted membrane, an aqueous solution containing 2 wt % of m-phenylenediamine (MPD) was put in interfacial contact with an organic solution containing 0.1 wt % of trimesoyl chloride (TMC) in an ISOPAR solvent (Exxon Corp.) to form a polyamide layer by a polymerization reaction between the compounds, completing a composite membrane.

Figure 4:
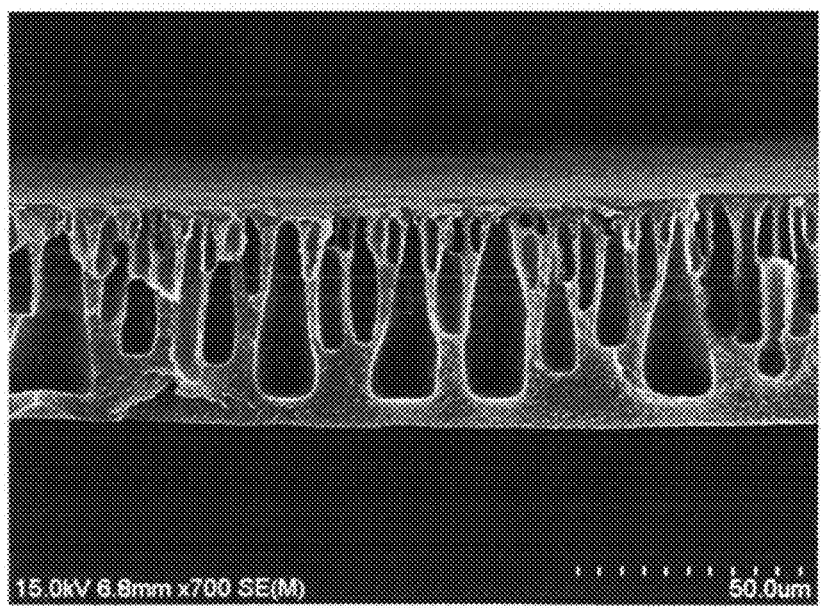
FIG. 4 is a micrograph showing the cross section of a hydrophilic polymer layer formed on the nonwoven fabric layer of FIG. 3.

FIG. 3 is a 700× SEM (Scanning Electron Microscope) micrograph showing the front view of the nonwoven fabric layer in the composite membrane. FIG. 4 is a 700× micrograph showing the side view of the hydrophilic polymer layer in the composite layer. As can be seen from FIGS. 3 and 4, the nonwoven fabric layer and the hydrophilic polymer layer constituting the composite membrane of Example 1 had high porosity and low pore tortuosity because of a uniform finger-like pore structure.

Examples 6 to 10

The procedures were performed to prepare a composite membrane in the same manner as described in Example 5, excepting that the membrane composition was given as presented in Table 2.

Example 11

Figure 6:
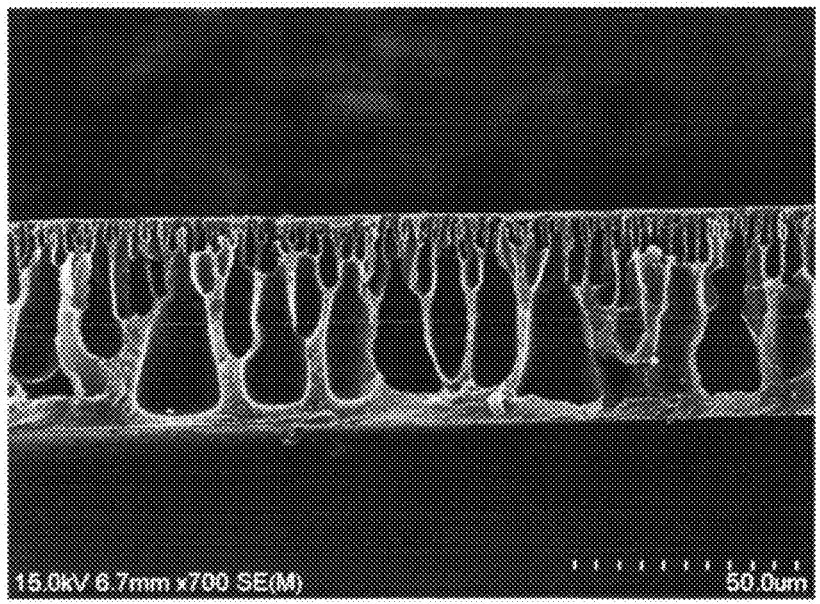
FIG. 6 is a micrograph showing the cross section of a hydrophilic polymer layer formed on the nonwoven fabric layer of FIG. 5.

The procedures were performed to prepare a composite membrane in the same manner as described in Example 5, excepting that there was used nonwoven fabric 2 with coarse porosity having an air permeability at least 10 cc/cm²·sec as shown in FIG. 5. The nonwoven fabric 2 had a contact angle changed from 114 degrees to 4 degrees over one second, with an average pore diameter of 293 μm. FIG. 6 is a micrograph showing the side view of a hydrophilic polymer layer formed on the nonwoven fabric 2 of FIG. 5.

The membranes prepared in Examples 5 to 11 were measured in regard to flux and back diffusion of the salts in the same manner as described in Experimental Examples 1 and 2. The results are presented in Table 2.

TABLE 2

| | | Property Assessment of Membrane Using 2M NaCl Draw Solution | | | |
|---|---|---|---|---|---|
| Div. | Membrane Composition | Draw Solution Composition (DS/FS) | Flux (GFD) | Change of the Conductivity per mm (μS/cm)/min | Back Diffusion of Salts per Area ((μS/cm)/min · cm²) |
| Example 5 | Nonwoven Fabric 1/ 17 wt % PAN/PA | 2M NaCl/DI water | 4.16 | 0.39 | 0.0163 |
| Example 6 | Nonwoven Fabric 1/ 13 wt % PAN/PA | 2M NaCl/DI water | 3.17 | 0.15 | 0.00625 |
| Example 7 | Nonwoven Fabric 1/ 10 wt % PAN/PA | 2M NaCl/DI water | 3.73 | 0.95 | 0.396 |
| Example 8 | Nonwoven Fabric 1/ 17 wt % CO-PAN/PA | 2M NaCl/DI water | 3.35 | 0.30 | 0.0125 |
| Example 9 | Nonwoven Fabric 1/ 20 wt % CO-PAN/PA | 2M NaCl/DI water | 2.99 | 0.41 | 0.0171 |
| Example 10 | Nonwoven Fabric 1/ 20 wt % P-CO-PAN/PA | 2M NaCl/DI water | 3.32 | 0.093 | 0.00388 |
| Example 11 | Nonwoven Fabric 2/ 17 wt % PAN/PA | 2M NaCl/DI water | 8.6 | 1.5 | 0.0625 |
| | | 2M NaCl/DI water (reverse) | 9.75 | 1.8 | 0.0750 |

TABLE 2-continued

Property Assessment of Membrane Using 2M NaCl Draw Solution

| Div. | Membrane Composition | Draw Solution Composition (DS/FS) | Flux (GFD) | Change of the Conductivity per mm (µS/cm)/min | Back Diffusion of Salts per Area ((µS/cm)/min · cm²) |
|---|---|---|---|---|---|
| Comparative Example 1 | 18% PSF/—/ PA | 2M NaCl/DI water | 1.2 | 0.065 | 0.00271 |
| Comparative Example 2 | CTA | 2M NaCl/DI water | 10 | 9.12 | 0.380 |

Nonwoven fabric 1: air permeability of 2 to 10 cc/cm² · sec
Nonwoven fabric 2: air permeability of at least 10 cc/cm² · sec
PAN: Polyacrylonitrile
P-CO-PAN: Polyacrylonitrile-vinylacetate copolymer
CO-PAN: Polyacrylonitrile-acrylic ester copolymer
PA: Polyamide
PSF: Polysulfone
S-PSf: Sulfonated Polysulfone
CTA: Cellulose Triacetate As shown in Table 2, the membranes prepared in the examples of the present invention were controllable in porosity and hydrophilicity depending on the type of nonwoven fabric or the type and content of the polymer constituting the hydrophilic polymer layer. The membranes of the present invention showed excellent flux and a conductivity not more than 1.8 µS/cm per minute (over a membrane area of 24 cm²), or a change of conductivity per area not more than 0.075 (µS/cm)/min·cm², thereby realizing a forward osmosis membrane preventing solutes of the draw solution from diffusing in the direction of reverse osmosis.

As shown in Examples 5 and 11, with the higher porosity of the nonwoven fabric layer in the same composition membrane (nonwoven fabric 1<nonwoven fabric 2), the flux was considerably enhanced to the level of Comparative Example 2, but the back diffusion of salts was considerably low relative to Comparative Example 2. These results show that the forward osmosis membrane of the present invention not only maintains high flux but also exhibits low back diffusion of salts, preventing solutes of the draw solution from diffusing in the direction of reverse osmosis.

Example 12

1. Preparation of Sulfonated Sulfone-Based Polymer 5 g of polysulfone and 50 mL of dichloromethane as monomers were put in a 100 mL four-necked flask equipped with a mechanical stirrer and a nitrogen inlet. The reaction solution was stirred at the room temperature for 18 hours and cooled down to 20° C. 0.5 mL of chlorosulfone diluted with dichloromethane was gradually added to the solution. The solution was stirred for 5 hours to form a copolymer. After completion of the reaction, the solution was removed of the residual solvent, and the precipitate was neutralized with a neutralizer (1N NaOH). After neutralization, the precipitate was washed and subjected to filtration. The copolymer product thus obtained was dried out in a vacuum oven at 80° C. for 24 hours to yield a sulfonated polysulfone-based polymer represented by the following formula 2 (weight average molecular weight: 69,000; and 50% sulfonation degree).

[Formula 2]

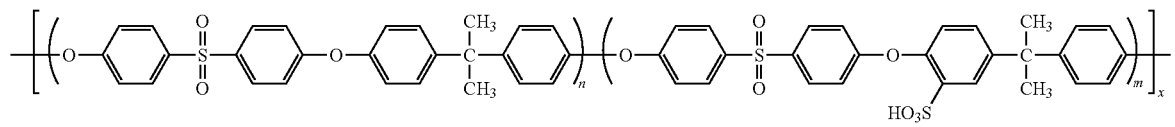

2. Preparation of Forward Osmosis Membrane

A hydrophilic polymer solution containing 17 wt % of polysulfone and 1 wt % of the sulfonated polysulfone-based polymer prepared in the precedent step was cast 150 µm thick on a nonwoven fabric layer having porosity with an air permeability of at least 6.3 cc/cm²·sec. The solution was subjected to phase separation in water used as a nonsolvent at the room temperature to form a hydrophilic polymer support. The hydrophilic polymer support formed on the nonwoven fabric layer was kept in ultrapure water for about one day to extract the solvent. On the surface of the solvent-extracted membrane, an aqueous solution containing 2 wt % of m-phenylenediamine (MPD) was put in interfacial contact with an organic solution containing 0.1 wt % of trimesoyl chloride (TMC) in an ISOPAR solvent (Exxon Corp.) to form a polyamide layer by a polymerization reaction between the compounds, completing a composite membrane.

Example 13

The procedures were performed to prepare a membrane in the same manner as described in Example 12, excepting that there was used a hydrophilic polymer solution containing 18 wt % of polysulfone and 1 wt % of sulfonated polysulfone, as given in Table 3.

The membranes prepared in Examples 12 and 13 were measured in regard to flux and back diffusion of salts in the same manner as described in Experimental Examples 1 and 2. The results are presented in Table 3.

TABLE 3

Property Assessment of Membrane Using 2M NaCl Draw Solution

| Div. | Membrane Composition | Draw Solution Composition (DS/FS) | Flux (GFD) | Change of the Conductivity (μS/cm)/min | Back Diffusion of Salts per Area ((μS/cm)/min · cm$^2$) |
|---|---|---|---|---|---|
| Example 12 | Nonwoven Fabric 2/ 17 wt % PSF + 1 wt % S-PSF/PA | 2M NaCl/DI water | 10.10 | 1.54 | 0.0642 |
| Example 13 | Nonwoven Fabric 2/ 18 wt % PSF + 1 wt % S-PSF/PA | 2M NaCl/DI 2M NaCl/DI (Reverse) | 11.24 13.75 | 0.36 3.81 | 0.0150 0.159 |
| Comparative Example 1 | 18 wt % PSF/—/PA | 2M NaCl/DI | 1.2 | 0.065 | 0.00271 |
| Comparative Example 2 | CTA | 2M NaCl/DI | 10 | 9.12 | 0.380 |

Nonwoven fabric 2: air permeability at least 10 cc/cm$^2$ · sec
PA: Polyamide
PSF: Polysulfone
S-PSF: Sulfonated Polysulfone
CTA: Cellulose Triacetate
DI: Ultrapure Water As shown in Table 3, the membranes prepared in Examples 12 and 13 exhibited excellent flux and a change of conductivity in the range of 0.36 to 1.54 μS/cm per minute (over a membrane area of 24 cm$^2$), realizing low back diffusion of salts. The back diffusion of the salts was evaluated to 0.0150 to 0.0642 (μS/cm)/min·cm$^2$. Thus, the membranes of Examples 12 and 13 met the requirement as a forward osmosis membrane that the solutes of the draw solution were prevented from diffusing in the direction of reverse osmosis. Besides, the membranes were controllable in porosity and hydrophilicity depending on the type and content of the polymer constituting the polymer support. More specifically, as shown in Examples 12 and 13, the flux was considerably increased depending on the polymer composition or the content of the sulfonated polysulfone used as a hydrophilic polymer.

In other words, the flux was remarkably enhanced to the extent as seen from the membrane consisting of a hydrophilic polymer in Comparative Example 2. The flux was more improved with an increase in the hydrophilic polymer content dependent on the sulfonated polysulfone content, and there existed an appropriate concentration with respect to the hydrophilic polymer content. In this manner, the forward osmosis membrane of the present invention not only maintains high flux but also prevents a back diffusion of solutes from the draw solution.

The membrane of Example 13 was measured in regard to flux variation by inducing the flow of the feed water in the direction of the Forward Osmosis mode or the Pressure Retarded Osmosis mode. The results showed that the flux was more enhanced in the PRO mode that the feed water flowed from the nonwoven fabric layer to the polyamide layer, rather than the FO mode that the feed water flowed from the polyamide layer to the nonwoven fabric layer.

FIG. 7 is a micrograph showing a cross section of the forward osmosis membrane having a hydrophilic polymer support layer containing a sulfonated polysulfone-based polymer in combination with a polysulfone polymer. The hydrophilic polymer layer was endowed with high porosity due to a uniform finger-like pore structure. The hydrophilic polymer layer also had low pore tortuosity due to the uniform finger-like pore structure. As seen from the examples of the present invention, the hydrophilic polymer support layer of the present invention is controllable in porosity by regulating the hydrophilic polymer content.

Example 14

A dimethylformamide solution containing 17.5 wt % of polyacrylonitrile (PAN) was cast 50±10 μm thick on a nonwoven polyester fabric (nonwoven fabric 1) having porosity with an air permeability of 6.3 cc/cm$^2$·sec and an average pore diameter of 7.5 μm. The nonwoven fabric was immersed on distilled water bath at the room temperature, solidified and sufficiently washed to prepare a forward osmosis membrane support consisting of nonwoven fabric-reinforced polyacrylonitrile (PAN). The forward osmosis membrane support thus obtained showed low pore tortuosity due to the finger-like pore structure. The support was then kept in ultrapure water for about one day to extract the solvent. The solvent-extracted support was immersed in an aqueous solution containing 2 wt % of m-phenyldiamine (MPD) and 0.1 wt % of N,N,N',N'-tetramethyl-1,6-hexadiamine (TMHD) used as an aqueous additive for 20 seconds, and removed of the water phase from the surface by compression. The substrate was put in interfacial contact with an organic solution containing 0.1 wt % of trimesoyl chloride (TMC) in an ISOPAR solvent (Exxon Corp.) for 40 seconds to form a polyamide layer through an interfacial polymerization reaction between the compounds. The forward osmosis membrane thus obtained was dried under an air atmosphere for one minute, immersed in an aqueous solution containing 0.2 wt % of an alkaline compound such as sodium carbonate at the room temperature for two hours and washed with distilled water to prepare a forward osmosis membrane having a composite membrane structure.

Examples 15 to 19

The procedures were performed to prepare a forward osmosis membrane of a composite membrane structure in the same manner as described in Example 14, excepting that the content of N,N,N',N'-tetramethyl-1,6-hexadiamine (TMHD) used as an aqueous additive in Example 14 was varied.

Examples 20 to 23

The procedures were performed to prepare a forward osmosis membrane of a composite structure in the same manner as described in Example 14, excepting that toluene sulfonic acid (TSA) was added to N,N,N',N'-tetramethyl-1,6-hexadiamine (TMHD) used as an aqueous additive in Example 17 to vary the concentration of TSA.

Examples 24 and 25

The procedures were performed to prepare a forward osmosis membrane of a composite structure in the same manner as described in Example 14, excepting that polyacrylonitrile-vinylacetate copolymer (P-CO-PAN) was used as a material of the polymer layer instead of polyacrylonitrile (PAN) and that the content of P-CO-PAN was varied.

Examples 26 and 27

The procedures were performed to prepare a forward osmosis membrane of a composite structure in the same manner as described in Example 24, excepting that there was used a nonwoven polyester fabric (nonwoven fabric 2) having porosity with an air permeability at least 10 cc/cm$^2$·sec and an average pore diameter at least 300 μm and that the content of P-CO-PAN was varied.

Comparative Example 3

The procedures were performed to prepare a forward osmosis membrane of a composite structure in the same manner as described in Example 14, excepting that the polyamide layer in Example 14 was formed without an aqueous additive.

The compositions of the membranes prepared in Examples 14 to 27 are presented in Table 4. The membranes were measured in regard to flux and back diffusion of salts in the same manner as described in Examples 1 and 2. The measurement results are presented in Table 5.

TABLE 4

Preparation of Forward Osmosis membrane

| | Forward Osmosis | Membrane Composition | | |
| | | | Polyamide Layer | |
| Div. | Separation Support (Nonwoven Fabric/ Polymer Layer) | Aqueous Solution Monomer | Aqueous Additive | Organic Solution Monomer |
| --- | --- | --- | --- | --- |
| Example 14 | Nonwoven Fabric 1/17.5 wt % PAN | 2 wt % MPD | 0.1 wt % TMHD | 0.1 wt % TMC |
| Example 15 | | | 0.2 wt % TMHD | |
| Example 16 | | | 0.5 wt % TMHD | |
| Example 17 | | | 1 wt % TMHD | |
| Example 18 | | | 1.2 wt % TMHD | |
| Example 19 | | | 2 wt % TMHD | |
| Example 20 | | | 1 wt % TMHD/0.5 wt % TSA | |
| Example 21 | | | 1 wt % TMHD/1 wt % TSA | |
| Example 22 | | | 1 wt % TMHD/1.1 wt % TSA | |
| Example 23 | | | 1 wt % TMHD/1.5 wt % TSA | |
| Comparative Example 3 | | | X | |
| Example 24 | Nonwoven Fabric 1/13 wt % P-CO-PAN | | 1 wt % TMHD/1 wt % TSA | |
| Example 25 | Nonwoven Fabric 1/15 wt % P-CO-PAN | | | |
| Example 26 | Nonwoven Fabric 2/17 wt % P-CO-PAN | | | |
| Example 27 | Nonwoven Fabric 2/15 wt % P-CO-PAN | | | |
| Comparative Example 1 | Nonwoven Fabric 3/18 wt % PSf | | | |

TABLE 4-continued

Preparation of Forward Osmosis membrane

| | Membrane Composition | | | |
|---|---|---|---|---|
| | Forward Osmosis | | Polyamide Layer | |
| Div. | Separation Support (Nonwoven Fabric/ Polymer Layer) | Aqueous Solution Monomer | Aqueous Additive | Organic Solution Monomer |
| Comparative Example 2 | CTA | | | |

Nonwoven fabric 1: air permeability of 2 to 10 cc/cm$^2$ · sec
Nonwoven fabric 2: air permeability at least 10 cc/cm$^2$ · sec
Nonwoven fabric 3: air permeability not more than 2 cc/cm$^2$ · sec
PAN: Polyacrylonitrile
P-CO-PAN: Polyacrylonitrile-vinylacetate copolymer
CO-PAN: Polyacrylonitrile-acrylic ester copolymer
PSf: Polysulfone
MPD: m-phenylenediamine
TMHD: N,N,N',N'-tetramethyl-1,6-hexadiamine
TMC: Trimesoyl chloride
TSA: Toluene sulfonic acid
CTA: Cellulose Triacetate

TABLE 5

Property Assessment of Membrane Using 2M NaCl Draw Solution

| Div. | Flux (GFD) | Change of the Conductivity (($\mu$S/cm)/min) | Back Diffusion of Salts per Area (($\mu$S/cm)/min · cm$^2$) |
|---|---|---|---|
| Example 14 | 3.68 | 0.09 | 0.00375 |
| Example 15 | 5.78 | 0.1 | 0.00417 |
| Example 16 | 6.07 | 0.16 | 0.00667 |
| Example 17 | 5.52 | 3.74 | 0.156 |
| Example 18 | 5.15 | 7.37 | 0.307 |
| Example 19 | X | X | X |
| Example 20 | 6.4 | 0.11 | 0.00458 |
| Example 21 | 6.14 | 0.1 | 0.00417 |
| Example 22 | 6.48 | 0.08 | 0.00333 |
| Example 23 | 4.92 | 0.15 | 0.00625 |
| Comparative Example 3 | 2.3 | 2.32 | 0.0967 |
| Example 24 | 7.8 | 0.64 | 0.0267 |
| Example 25 | 7.96 | 0.54 | 0.0225 |
| Example 26 | 8.64 | 2.28 | 0.0950 |
| Example 27 | 15.5 | 2.13 | 0.0888 |
| Comparative Example 1 | 1.2 | 0.07 | 0.00292 |
| Comparative Example 2 | 10 | 9.12 | 0.380 |

As shown in Tables 4 and 5, the forward osmosis membrane (Comparative Example 3) having a polyamide layer prepared without using an additive to the aqueous solution was remarkably poor in flux relative to the membranes prepared in the examples of the present invention, but was superior in back diffusion variation of salts to the membrane (Comparative Example 2) consisting a single cellulose triacetate (CTA) material.

According to the property measurements, the membrane (Comparative Example 1) having a polyamide layer formed on a polysulfone porous support as a support for a conventional reverse osmosis membrane showed an excellent effect of preventing back diffusion of salts but an extremely low flux, making the membrane impractical as a forward osmosis membrane driven by a concentration gradient difference.

Contrarily, the forward osmosis membranes prepared in the examples of the present invention were capable of preventing back diffusion of salts of the draw solution and controllable in flux depending on the type of nonwoven fabric and the type and content of the polymer constituting the support.

Hence, the forward osmosis membrane according to the embodiment of the present invention realized a forward osmosis membrane that had high flux and low change of the conductivity per min not more than 9.0 ($\mu$S/cm)/min or not more than 0.375 ($\mu$S/cm)/min·cm$^2$, relative to the membrane consisting of cellulose triacetate (salt diffusion assessment: conductivity 9.12 ($\mu$S/cm)/min), thereby minimizing diffusion of the solutes of the draw solution and securing low back diffusion of salts.

As shown in Examples 24 and 27, it was possible to enhance the flux and to realize low back diffusion of salts when the membrane was prepared using nonwoven fabric 2 (air permeability at least 10 cc/cm$^2$·sec) of high porosity with the same membrane composition excepting the use of nonwoven fabric having a different porosity.

As described above, firstly, the present invention provides a forward osmosis membrane for seawater desalination that has a composite membrane structure of sequentially laminated layers including a hydrophilic polymer layer and a polyamide layer.

Secondly, the present invention provides a forward osmosis membrane for seawater desalination that has a composite membrane structure including a hydrophilic polymer layer and a polyamide layer sequentially laminated on a nonwoven fabric layer.

Thirdly, the present invention provides a method for preparing a forward osmosis membrane for seawater desalination that facilitates an inflow of water from the feed water to the draw solution, realizes high water permeability in the direction of osmosis using a hydrophilic polymer layer and exhibits contamination resistance using a polyamide layer formed on the hydrophilic polymer layer by interfacial polymerization.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

We claim:

1. A forward osmosis membrane for seawater desalination in a forward osmosis mode, said forward osmosis membrane having a composite membrane structure of sequentially laminated layers comprising:
  a hydrophilic polymer layer having finger-like pores; and
  a polyamide layer;
  wherein the forward osmosis membrane satisfies both (i) a back diffusion of salts from a draw solution not more than 0.375 (μS/cm)/min·cm² and (ii) a flux of 3 to 30 GFD as measured using a feed water and a 2M NaCl draw solution in the forward osmosis mode;
  wherein the hydrophilic polymer layer contains 10 to 25 wt % content of a hydrophilic polymer including any one selected from the group consisting of hydrophilic polyacrylonitrile, polyacrylonitrile-vinylacetate copolymer (P-CO-PAN), and polyacrylonitrile-acrylic ester copolymer (CO-PAN); or the hydrophilic polymer containing 0.1 to 10 wt % of a sulfonated polysulfone-based polymer represented by formula 1 in combination with a polysulfone-based polymer;

[Formula 1]

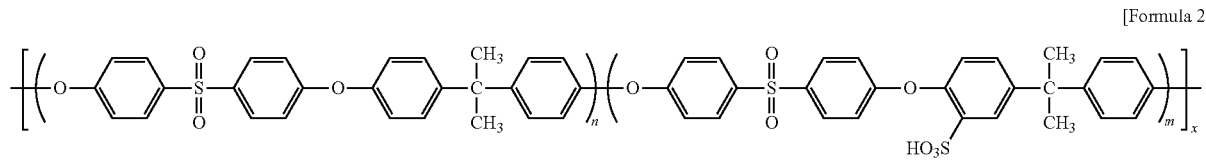

wherein A is any one functional group selected from:

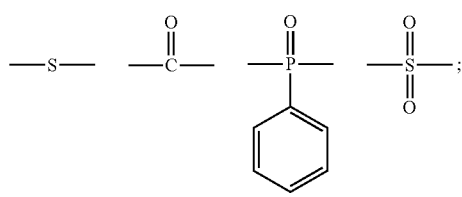

B is any one functional group selected from:

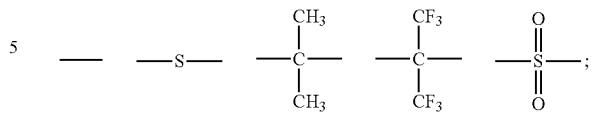

m/(n+m) is 0.2 to 0.7; and x is 50 to 2,300.

2. The forward osmosis membrane for seawater desalination according to claim 1, wherein the polysulfone-based polymer is any one selected from the group consisting of polysulfone, polyethersulfone, and polyarylethersulfone, either alone or as any mixture thereof.

3. The forward osmosis membrane for seawater desalination according to claim 1, wherein the sulfonated polysulfone-based polymer is a compound represented by formula 2:

[Formula 2]

wherein m/(n+m) is 0.2 to 0.7; and x is 50 to 2,300.

4. The forward osmosis membrane for seawater desalination according to claim 1, wherein the polymer layer has a thickness of 30 to 250 μm.

5. The forward osmosis membrane for seawater desalination according to claim 1, wherein an interfacial polymerization of an aqueous solution forms the polyamide layer by further adding 0.01 to 2 wt % of the polyamine salt compound to an aqueous solution containing polyfunctional amine or alkylated aliphatic amine and an organic solution containing a polyfunctional acyl halide compound.

6. The forward osmosis membrane for seawater desalination according to claim 5, wherein the polyamine salt compound is prepared from a tertiary polyamine and a strong acid at a molar ratio of 0.5~2:1.

7. The forward osmosis membrane for seawater desalination according to claim 6, wherein the tertiary polyamine is any one selected from the group consisting of 1,4-diazabicyclo[2,2,2]octane (DABCO), 1,8-diazabicyclo[5,4,0]undec-7-ene (DBU), 1,5-diazabicyclo[4,3,0]none-5-ene (DBN), 1,4-dimethylpiperazine, 4-[2-(dimethylamino)ethyl]morpholine, N,N,N',N'-tetramethylethylenediamine, N,N,N',N'-tetramethyl-1,3-butanediamine, N,N,N',N'-tetramethyl-1,4-butanediamine (TMBD), N,N,N',N'-tetramethyl-1,3-propanediamine, N,N,N',N'-tetramethyl-1,6-hexanediamine (TMHD), 1,1,3,3-tetramethylguanidine (TMGU) and N,N,N',N',N''-pentamethyldiethylenetriamine.

8. A forward osmosis membrane for seawater desalination in a forward osmosis mode, said forward osmosis membrane having a composite membrane structure of sequentially laminated layers comprising:
  a nonwoven fabric layer;
  a hydrophilic polymer layer having finger-like pores; and
  a polyamide layer;
  wherein the forward osmosis membrane satisfies both (i) a back diffusion of salts from a draw solution not more than 0.375 (μS/cm)/min·cm² and (ii) a flux of 3 to 30 GFD as measured using a feed water and a 2M NaCl draw solution in the forward osmosis mode;

wherein the hydrophilic polymer layer contains 10 to 25 wt % content of a hydrophilic polymer including any one selected from the group consisting of hydrophilic polyacrylonitrile, polyacrylonitrile-vinylacetate copolymer (P-CO-PAN), and polyacrylonitrile-acrylic ester copolymer (CO-PAN); or the hydrophilic polymer containing 0.1 to 10 wt % of a sulfonated polysulfone-based polymer represented by formula 1 in combination with a polysulfone-based polymer;

13. The forward osmosis membrane for seawater desalination according to claim 8, wherein the polysulfone-based polymer is any one selected from the group consisting of polysulfone, polyethersulfone, and polyarylethersulfone, either alone or as any mixture thereof.

14. The forward osmosis membrane for seawater desalination according to claim 8, wherein the sulfonated polysulfone-based polymer is a compound represented by formula 2:

[Formula 1]

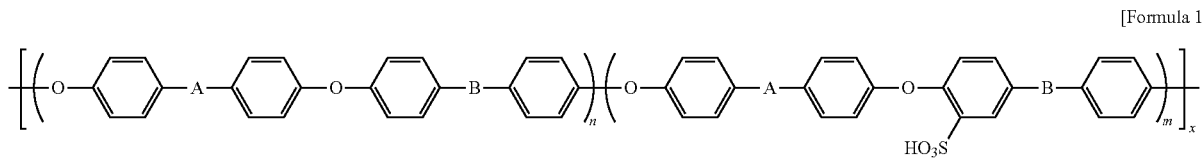

wherein A is any one functional group selected from:

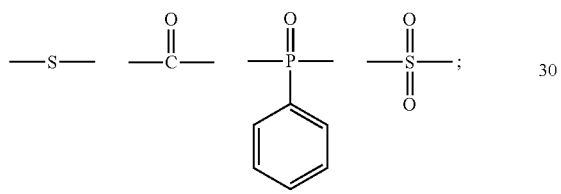

[Formula 2]

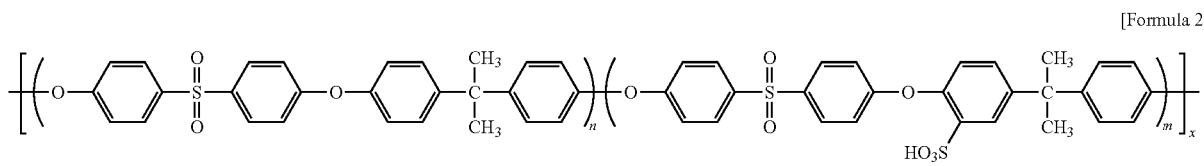

B is any one functional group selected from:

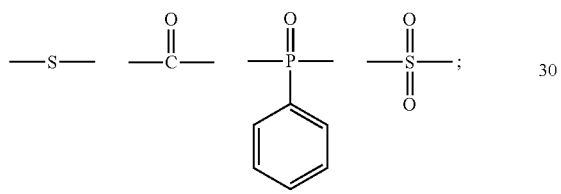

m/(n+m) is 0.2 to 0.7; and x is 50 to 2,300.

9. The forward osmosis membrane for seawater desalination according to claim 8, wherein the nonwoven fabric layer has an air permeability of at least 2 cc/cm²·second.

10. The forward osmosis membrane for seawater desalination according to claim 8, wherein the nonwoven fabric layer has an average pore size of 1 to 600 μm.

11. The forward osmosis membrane for seawater desalination according to claim 8, wherein the nonwoven fabric layer has a contact angle in the range of 0.1 to 74 degrees.

12. The forward osmosis membrane for seawater desalination according to claim 8, wherein the nonwoven fabric layer has a thickness of 20 to 150 μm.

wherein m/(n+m) is 0.2 to 0.7; and x is 50 to 2,300.

15. The forward osmosis membrane for seawater desalination according to claim 8, wherein the polymer layer has a thickness of 30 to 250 μm.

16. The forward osmosis membrane for seawater desalination according to claim 8, wherein an interfacial polymerization of an aqueous solution forms the polyamide layer by further adding 0.01 to 2 wt % of the polyamine salt compound to an aqueous solution containing polyfunctional amine or alkylated aliphatic amine and an organic solution containing a polyfunctional acyl halide compound.

17. The forward osmosis membrane for seawater desalination according to claim 16, wherein the polyamine salt compound is prepared from a tertiary polyamine and a strong acid at a molar ratio of 0.5~2:1.

18. The forward osmosis membrane for seawater desalination according to claim 17, wherein the tertiary polyamine is any one selected from the group consisting of 1,4-diazabicyclo[2,2,2]octane (DABCO), 1,8-diazabicyclo[5,4,0]undec-7-ene (DBU), 1,5-diazabicyclo[4,3,0]none-5-ene (DBN), 1,4-dimethylpiperazine, 4-[2-(dimethylamino)ethyl]morpholine, N,N,N',N'-tetramethylethylenediamine, N,N,N',N'-tetramethyl-1,3-butanediamine, N,N,N',N'-tetramethyl-1,4-butanediamine (TMBD), N,N,N',N'-tetramethyl-1,3-propanediamine, N,N,N',N'-tetramethyl-1,6-hexanediamine (TMHD), 1,1,3,3-tetramethylguanidine (TMGU) and N,N,N',N',N''-pentamethyldiethylenetriamine.

* * * * *